US011032254B2

(12) United States Patent
McCallum et al.

(10) Patent No.: US 11,032,254 B2
(45) Date of Patent: Jun. 8, 2021

(54) BINDING DATA TO A NETWORK IN THE PRESENCE OF AN ENTITY

(71) Applicant: Red Hat, Inc., Raleigh, NC (US)

(72) Inventors: Nathaniel McCallum, Raleigh, NC (US); Robert J. Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 367 days.

(21) Appl. No.: 15/257,552

(22) Filed: Sep. 6, 2016

(65) Prior Publication Data
US 2018/0069842 A1 Mar. 8, 2018

(51) Int. Cl.
*H04L 29/06* (2006.01)
(52) U.S. Cl.
CPC ........ *H04L 63/0442* (2013.01); *H04L 63/061* (2013.01)
(58) Field of Classification Search
CPC .......................... H04L 63/0442; H04L 63/061
USPC ......................................................... 713/171
See application file for complete search history.

(56) References Cited

U.S. PATENT DOCUMENTS

| 5,337,357 | A | * | 8/1994 | Chou ................ G06F 12/1408 340/5.74 |
| 7,373,517 | B1 | | 5/2008 | Riggins |
| 7,418,596 | B1 | | 8/2008 | Carroll et al. |
| 7,447,903 | B2 | | 11/2008 | Sandhu et al. |
| 7,487,353 | B2 | | 3/2009 | Pryor et al. |
| 8,495,366 | B2 | | 7/2013 | Banerjee et al. |
| 8,582,777 | B2 | | 11/2013 | Urivskiy et al. |
| 8,707,043 | B2 | | 4/2014 | Wason et al. |
| 2002/0032860 | A1 | * | 3/2002 | Wheeler ................ G06Q 20/00 713/170 |
| 2003/0233580 | A1 | * | 12/2003 | Keeler ................ G06Q 20/206 726/7 |
| 2006/0165233 | A1 | * | 7/2006 | Nonaka .................... G06F 21/10 380/44 |
| 2011/0320819 | A1 | * | 12/2011 | Weber .................... H04L 9/0825 713/176 |
| 2014/0237229 | A1 | * | 8/2014 | Rosenblatt ............ H04W 12/08 713/159 |

(Continued)

OTHER PUBLICATIONS

Nathaniel McCallum, GitHub, "Tang binding daemon", Jan. 29, 2016 GitHub, Inc., 6 pages (https://github.com/npmccallum/tang).

*Primary Examiner* — Teshome Hailu
(74) *Attorney, Agent, or Firm* — Womble Bond Dickinson (US) LLP

(57) ABSTRACT

Implementations of the disclosure provide for binding data to a network in the presence of an entity. In one implementation, a cryptographic system is provided. The cryptographic system includes a memory to store encrypted data, and a processing device, operatively coupled to the memory, to identify a public key for a communications device in response to an indication of a presence of the communications device on a network. A first intermediate is determined in view of the public key for the communications device and in view of an acquisitioning public key. The acquisitioning public key associated with the encrypted data. A second intermediate public key is received from the communications device in view of the first intermediate public key. Thereupon, the encrypted data is decrypted using an encryption key derived at least from the second intermediate public key.

12 Claims, 5 Drawing Sheets

(56) References Cited

U.S. PATENT DOCUMENTS

| | | | | |
|---|---|---|---|---|
| 2014/0237256 A1* | 8/2014 | Ben Ayed | ............. | H04L 9/0866 |
| | | | | 713/186 |
| 2014/0331043 A1* | 11/2014 | Cho | ................... | G06F 21/6209 |
| | | | | 713/165 |
| 2016/0203086 A1* | 7/2016 | Ng | ......................... | G06F 21/00 |
| | | | | 713/193 |

* cited by examiner

US 11,032,254 B2

BINDING DATA TO A NETWORK IN THE PRESENCE OF AN ENTITY

TECHNICAL FIELD

The disclosure is generally related to cryptographic computing security, and more particularly, to binding data to a network in the presence of an entity.

BACKGROUND

Cryptographic systems are widely used to protect data used in communication networks. Various mechanisms have been proposed to accomplish this purpose and to defend against third-party hackers. Some systems encrypt data according to a cryptographic encryption key. In this regard, a key escrow is a system that may be used to hold in escrow the encryption keys to decrypt and encrypt the data so that, under certain circumstances, an authorized party may gain access to those keys.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
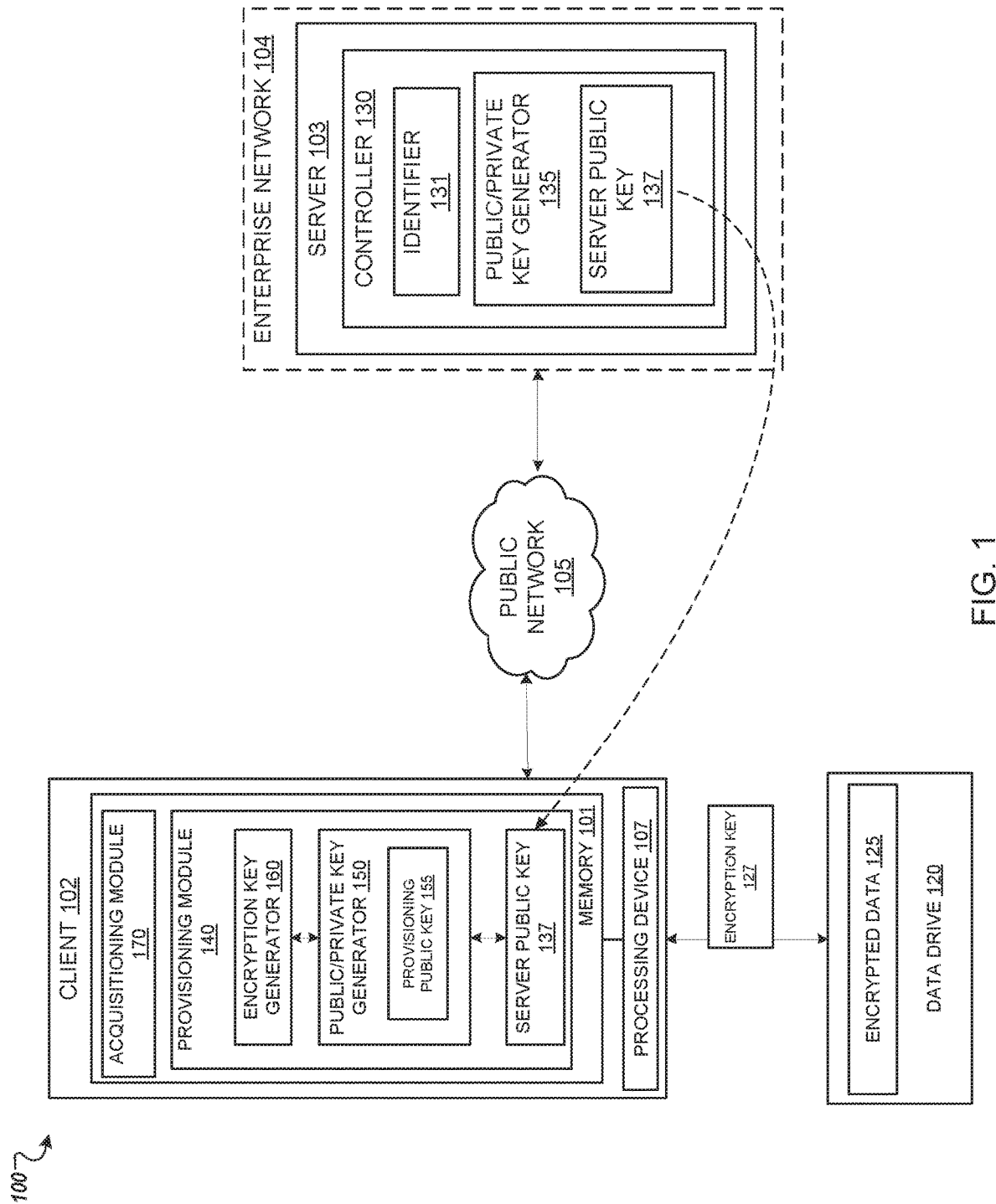
FIG. 1 depicts a block diagram of an example of a cryptographic system for binding data to a network in the presence of an entity in accordance with one or more aspects of the disclosure.

Implementations of the disclosure describe binding data to a network in the presence of an entity (e.g., communications device). The techniques of the disclosure may be used to protect encrypted data "at rest" on a client device between access requests, and only makes that data available when the client device is on a certain network. In some communication networks, an encryption key can be used to encrypt and decrypt some type of data. For example, an encryption key may be generated to encrypt data stored on a client device. Subsequently, the encryption key may be used to decrypt the data for access by the client device. In this regard, the encryption key protects the data on the client device from system attacks by, for example, unauthorized parties or system hackers as well as other types of unauthorized access of the data.

In some situations, a remote server also known as an "escrow" may be used to store the encryption key in which the client device may later request access to the key. Once the client device is authenticated, the remote server may transmit the encryption key to the client for accessing the encrypted data. In such cases, however, access to data on the client cannot be done offline since the encryption key is stored at a remote server. In this regard, all transfers of the encryption key from the remote server occur within an encrypted channel, which adds a layer of complexity and a possible compromise point for the keys. In addition, the remote server utilizes authentication to ensure that an authorized party accesses the keys. Furthermore, the remote server should be able to maintain a secure state that includes backup redundancies, which can adversely impact system performance as well as provide a centralized location of potential attack by hackers.

In accordance with the disclosure, implementations provide for the encryption/decryption of data on a client device when the client device is in the presence of a communications device (e.g., some type of access point device, communications beacon, etc.) on a certain network. This encryption/decryption of data on the client device is conducted without performing an exchange of an encryption key, such as from an escrow. For example, the client device is only able to recalculate the encryption key to access the encrypted data when it is in range of the communications device.

In some implementations, the client device may receive a public key associated with the communications device. The client device uses the public key to generate an encryption key to encrypt the data. Once the data is encrypted, the client discards the encryption key. This process produces some metadata that is stored at the client device. When the client is in the presence of the communications device, the metadata is loaded in order for the client to recover the encryption key. In some implementations, the client device may recalculate the encryption key when the communications device performs one or more of the recalculations steps. In this regard, the client device is performing a key exchange with itself, thereby limiting any chance for a system hacker to access sensitive data. Moreover, because the communications device lacks any per-state data it does not have to be authenticated or backed-up. The moment the client device is moved outside of the presence of the communications device, the client device is not able to recover the encryption key to decrypt the encrypted data.

FIG. 1 depicts a block diagram of an example of a cryptographic system 100 for binding data to a network in the presence of an entity in accordance with one or more aspects of the disclosure. The cryptographic system 100 may include one or more computer devices, such as client device 102 and server device 103, interconnected by one or more networks 104 and 105, such as a Local Area Network (LAN), an intranet, an extranet, or the Internet. As used herein, a "client device" refers to a computing device including one or more processing device 107, one or more memory devices 101, and one or more communication interfaces, such as for communication over the networks 104 and 105.

As used herein, a "processing device" refers to a device capable of executing instructions encoding arithmetic, logical, or I/O operations. In one implementation, the processing device 107 may follow Von Neumann architectural model and may include an arithmetic logic unit (ALU), a control unit, and a plurality of registers. In further implementations, the processing device 107 may be a single core processor which is typically capable of executing one instruction at a time (or process a single pipeline of instructions), or a multi-core processor which may simultaneously execute multiple instructions. In another implementation, the processing device 107 may be implemented as a single integrated circuit, two or more integrated circuits, or may be a component of a multi-chip module (e.g., in which individual microprocessor dies are included in a single integrated circuit package and hence share a single socket). A "memory device" herein shall refer to a volatile or non-volatile memory device 102, such as RAM, ROM, EEPROM, or any other device capable of storing data. A "communication interface" herein shall refer to circuitry or device communicatively coupled to one or more processors and capable of routing data between the processors and one or more external devices.

Referring to FIG. 1, the cryptographic system 100 may include a client device 102 that is operatively connected to an enterprise network 104 via a public network 105 (e.g., Internet). The client device 102 may be a computing device such as a computer, a tablet, or a smart phone on which a user of the client device may have established an account. In some implementations, the user may log into an account associated with the enterprise network 104 by providing certain credentials (such as a matching pair of a user identifier and a password) associated with the user identifier. The client device 102 may further establish a secured communication channel with the enterprise network 104 via the public network 105 according to certain protocols.

The enterprise network 104 may include physical servers (e.g., server device 103) and/or virtual machines, raw and file-based storage, routers, firewalls, and/or load balancers interconnected by two or more LANs. In some implementations, enterprise network 104 may include an internal network. In other implementations, enterprise network 104 may include various other network topologies, including two or more internal networks and/or one or more de-military zone (DMZ) networks, etc.

In some implementations, client device 102 may be coupled to a data drive 120. In one implementation, the data drive 120 may be part of the client device 102. For example, the data drive 120 may be part of the memory 101. The data drive 120 may be a device that serves data stored thereon to client device 102. The data stored on data drive 120 can be application programs and data associated with these applications programs. In one implementation, for security reasons, an encrypted portion of data drive 120 may be used to store encrypted data 125.

In one illustrative example, the client device 102 may be a laptop with encrypted data 125 that needs utilizes the encryption key 127 to decrypt the data. Data encryption includes a process of converting data (e.g., plain text data) into encrypted data 125 (e.g., cipher-text) using an encryption key, such as encryption key 127, to scramble the data (or cipher) so that it is incomprehensible to human readers. The encryption can be achieved with various types of encryption schemes for data encryption, including, for example, the Advanced Encryption Standard (AES) scheme. In some implementations, the encrypted data 125 may be converted back to the original data through a decryption process using the same encryption key 127. The restored data may be stored in a memory (e.g., memory 101) associated with the client device without storing it back in the data drive 120. The client device 102 may be configured to interface with the data drive 120 to activate the encryption/decryption process for the encrypted data 125 using encryption key 127.

Implementations of the disclosure protect the encrypted data 125 such that the client device 102 is able to recover an encryption key, such encryption key 127, only when the client device 102 is in the presence of server device 103. In some implementations, the client device 102 is able to recover the encryption key 127 when the client is in a certain range of the service device 103. Range may refer to a geographic distance between the client device 102 and server device 103 in which signals can be transmitted between the two devices.

In other implementations, the client device 102 is able to recover the encryption key 127 when the client is on a particular network segment associated with the server device 103. For example, one or more firewalls may be used to segment networks in order to monitor network traffic associated with the server device 103. In some implementations, the client device 102 may issue an instruction to access the server device 103 via a network segment or network, such as network 104. In response, the client device 102 receives an indication as to whether the access succeeded or failed. If the client device 102 the instruction to access the server device 103 succeeds, this indicates the presence of the server device 103. Still further, other techniques may be used to identify that the client device 102 is in the presence of the server device 103.

The client device 102 may use the encryption key 127 to access the encrypted data 125, and then may discard the encryption key 127. In some implementations, the client device 102 may retain the key for a period of time even when that use of the key continues beyond the determined range (e.g., outside of the presence of server device 103). If the client device 102 moves out of range of the server device 103 or off of the network 104 associated with the server device 103, the client device 102 is not able to access the encrypted data 125 because it is not be able to recover the encryption key 127.

In some implementations, server device 103 may be a communications device, such as third-party Bluetooth beacon or other types of communications devices, associated with the enterprise network 104. One example of a communications device may include a Bluetooth beacon that emits a lower power signal a determined distance within a certain GHz frequency band. The server device 103 may include a controller 130 to convey an identifier 131 (e.g., a plurality of bits) encoded within the transmitted signal, which is established by the server device 103. For example, the identifier 131 may a MAC identifier or another type of identifier to uniquely identify the server device 103.

In some implementations, the client device 102 may include circuitry to detect transmitted signal from the server device 103. For example, the client device 102 may include various sensors and receivers to determine that the server device 103 is within a geographic distance corresponding to a determined range of the client device 102, and later extract information from the transmitted signal. After the client device 102 extracts the identifier 131 from the transmitted signal, the client device 102 may use that identifier 131 to obtain associated information or metadata to trigger a particular action to be executed.

In one example, the server device 103 may trigger a provision module 140 of the client device 102 to provision (e.g., encrypt) data with the encryption key 127. For example, the provision module 140 may be executed by the processing device 107 in response to detecting the presence of the server device 103. In some implementations, the server device 103 first computes a private/public key pair using private/public key generator 135. In one implementation, the private/public key generator 135 may generate a private key (R) and a public key (r) based on the private key (R) using the following formula:

$$r = g^R$$

where operator "^" indicates a group operator, such as a point multiplier as in ECC (although other group operators are possible), "r" is the public key, such as server public key 137, that is derived from "g", which is based on a generator value, and "R" which is a private (e.g., session) key value, such as a random number. In some implementations, g is public constant based on a primitive root modulo p operation where p is also a public constant, such as a prime number (e.g., a large number of at least 512 bits) that is not kept secret and can be shared with the client device 102. For example, the client device 102 and server device 103 may agree on public constants g and p. In other implementations, g may be determined by executing an elliptic curve cryptographic (ECC) generator that may select a point on an elliptic curve to generate a random number. For example, an elliptic curve is a mathematical structure that is used to generate a verifiable random number. Still further, other techniques may be used to generate g.

In accordance with implementations of the disclosure, the server device 103 transmits the generated server public key 137 to client device 102. For example, the server device 103 transmits the server public key 137 over network 105 using various techniques. In one implementation, an Internet transport protocol (e.g., TCP/IP or UDP) may specify how the server public key 137 is transmitted over the network 105 to client device 102. In the regard, unauthorized parties are not able to ascertain the private key even if they were able to obtain the server public key 137 during transmission over the network 105 because calculating a public key from a private key is a one-way operation.

Upon receiving the server public key 137, the provision module 140 of client device 102 also computes a private/public key pair using is own public/private key generator 150. For example, the processing device 107 may execute the public/private key generator 150 of the provision module 140 to compute a public/private key pair (a, A) based on the following formula:

$$a = g\hat{\,}A$$

where operator "^" indicates a group operator, such as a point multiplier as in ECC (although other group operators are possible), "a" is a provisioning public key 155 that is derived from "g" which is a generator value, and "A" which is a private (e.g., session) key value, such as a random number. In some implementations, g is public constant based on a primitive root modulo p operation where p is the prime number shared with the server device 103. For example, as discussed above, the client device 102 and server device 103 may agree on public constants g and p.

Thereupon, the client device 102 calculates an encryption key, such as encryption key 127, using encryption key generator 160. For example, the processing device 107 may execute the encryption key generator 160 to compute encryption key 127 based on the following formula:

$$K = r\hat{\,}A$$

where operator "^" indicates a group operator, such as a point multiplier as in ECC (although other group operators are possible), "K" is the encryption key 127, "r" is the server public key 137 from server device 103 and "A" is the private (e.g., session) key value associated with the encrypted data 125. The client device 102 uses the encryption key 127 to encrypt the encrypted data 125 stored on the data drive 120. Once the data is encrypted, the client device 102 discards encryption key 127 and the private key value "A", but retains the server public key 137 associated with the server device 103 and the provisioning public key 155. For example, the client device 102 may store the server public key 137 of the server device 103 in memory 101 to indicate that the public key is associated with the encrypted data 125. In other implementations, the store a type reference to the server public key 137 rather than the key itself.

In another example action that may be executed in response to the presence of the server device 103, client device 102 may be triggered for an acquisition of the encrypted data 125. For example, the processing device 107 of the client device 102 may execute the acquisitioning module 170 to recover the encryption key 127 in response to detecting that server device 103 is within a certain range. The client device 102 can then use the recovered encryption key 127 to decrypt the encrypted data 125. The functionally of acquisitioning module 170 can exist in a fewer or greater number of modules than what is shown. The module 170 may be operable in conjunction with the cryptographic system 100 to send and receive relevant information to recover the encryption key 127 for decrypting encrypted data 125 as discussed in more detail below with respect to FIG. 2.

Figure 2:
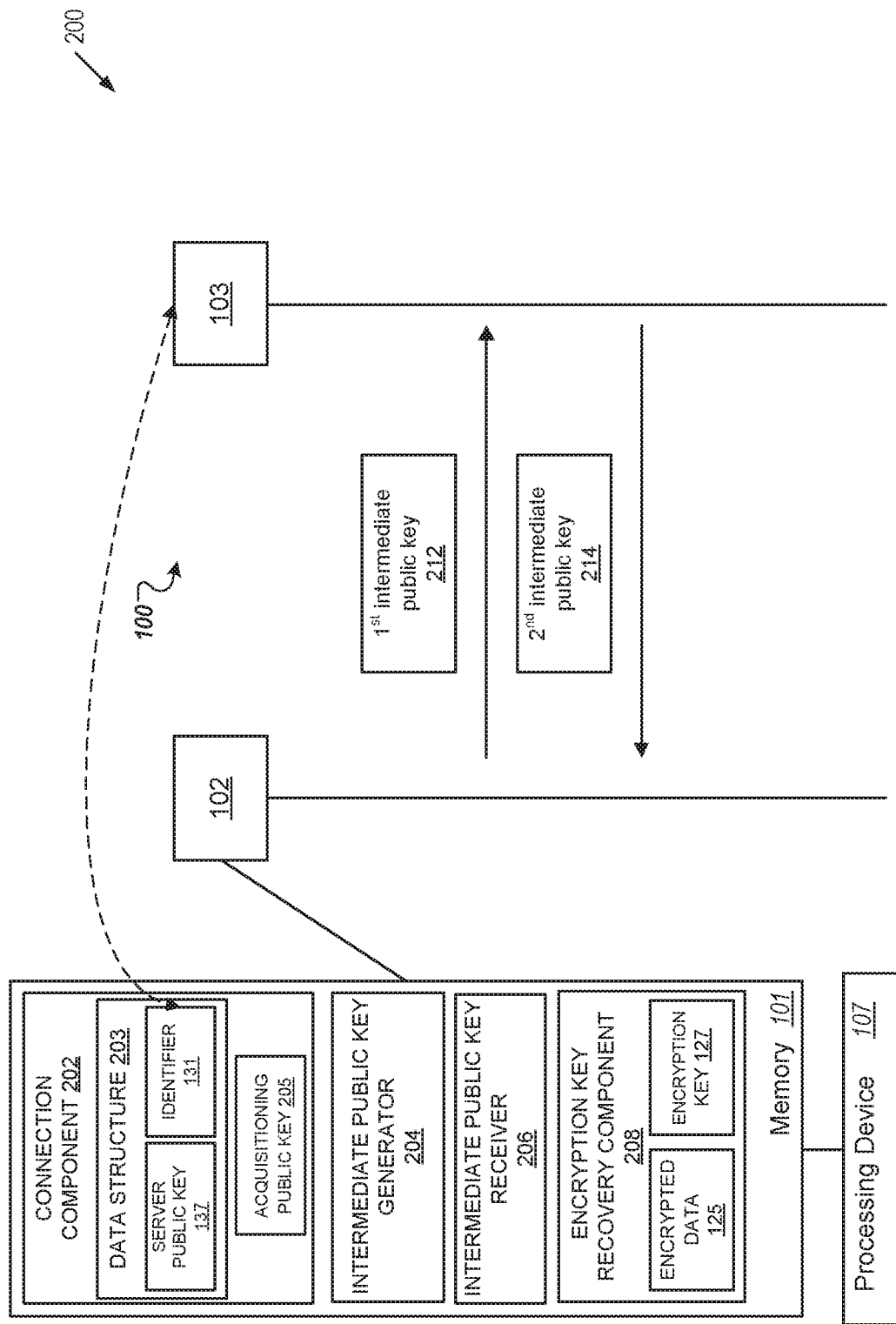
FIG. 2 depicts is another view of the cryptographic system of FIG. 1 in accordance with one or more aspects of the disclosure.

FIG. 2 depicts is another view 200 of the cryptographic system 100 of FIG. 1 in accordance with one or more aspects of the disclosure. As shown, the cryptographic system 100 includes another view of memory 101 and processing device 107 (e.g., of client device 102) of FIG. 1. As discussed, the processing device 107 may execute instructions stored in the memory 101 for carrying out the operations of the modules for the acquisition of encrypted data 125 stored in the memory 101. For example, cryptographic system 100 may include modules for binding data to a network in the presence of an entity. In one implementation, these modules include a connection component 202, an intermediate public key generator 204, an intermediate public key receiver 206 and encryption key recovery component 208. Instructions to execute the detection component 202, intermediate public key generator 204, intermediate public key receiver 206, and encryption key recovery component 208 may be stored in memory 101 and utilized by processing device 107 for execution of the respective components 202-208. The modules may be operable in conjunction with the client device 102 to send and receive relevant information regarding the encryption key 127

The connection component 202 of device 102 may access the server device 103 if it is the presence of the client device 102 and, in response, identify a public key associated with the server device 103. For example, the connection component 202 may include various sensors and receivers to transmit signals between the client device 102 and the server device 103. In some implementations, the transmitted signal may include identifier 131, which can be used to identify that server device 103 is within a certain range. For example, the identifier 131 may a MAC identifier or another type of unique identifier associated with the server device 103.

In some implementations, once the identifier 131 for the server device 103 is received, the connection component 202 uses the identifier 131 to identify a public key, such as server public key 137, associated with the server device 103. For example, the server device 103 may identify an entry in a data structure 203 in memory 101 that has a field with data corresponding to the identifier 131. In implementations, the client device 102 stores an association between the server public key source and the identifier 131 in the data structure 203. For example, the client device 102 may store the association in the data structure 203 when the client device with memory 101 receives the server public key 137 during the provisioning of the encrypted data 125 stored in memory 101. In some implementations, the data structure 203 may be a table or an array that includes a plurality of entries, or other types of memory data structures for storing and retrieving information.

In some implementations, the connection component 202 computes a public/private key pair. For example, the public/private key pair (x, X) may be based on the following formula:

$$x = g\char`^X$$

where operator "^" indicates a group operator, such as a point multiplier as in ECC although other group operators are possible, "x" is an acquisitioning public key 205 that is derived from g which is a generator value, and "X" which is a private (e.g., session) key value, such as a random number. In some implementations, "g" is a public constant based on a primitive root modulo p operation where p is the prime number shared with the server device 103. As noted above, the client device 102 and server device 103 may agree on public constants g and p.

The intermediate public key generator 204 may determine a first intermediate public key 212 based on the acquisitioning public key 205. In one implementation, the intermediate public key generator 204 may compute the first intermediate public key 212 based on the following formula:

$$y = a\char`^x$$

where "y" is the first intermediate public key 212 derived from a combination of "a" (which is the provisioning public key 145 that the client device 102 stored upon provisioning of the encrypted data 125) and "x" (which is the acquisitioning public key 205 that was generated upon detection of the presence of server device 103).

The intermediate public key generator 204 may then transmit the first intermediate public key 212 to the server device 103. For example, the public key generator 204 may transmit the first intermediate public key 212 using public network 105 from FIG. 1. In some implementations, the first intermediate public key 212 may be transmitted in plaintext to the server device because the key 212 does not contain discernible or sensitive information. In this way, even if an unauthorized party is able to intercept the transmission, the unauthorized party is not able to recreate the encryption key 127.

In some implementations, the intermediate public key receiver 206 may receive a second intermediate public key 214 from the server device 103 in view of the transmission of the first intermediate public key 214 to the server device 103. For example, responsive to receiving the first intermediate public key 212, the server device 103 may compute the second intermediate public key 212 based on the following formula:

$$z = y\char`^R$$

where operator "^" indicates a group operator, such as a point multiplier as in ECC (although other group operators are possible), "z" is the second intermediate public key 214 derived from a combination of "y", which is the first intermediate public key 212, and "R", which is a private key value that was generated by the server device 103 using the public/private key generator 135 of FIG. 1. After computing the second intermediate public key 214, the server device 103 transmits the second intermediate public key 214, for example, using network 105 to the client device 102.

In some implementations, the encryption key recovery component 208 may produce the encryption key 127 to decrypt encrypted data 125 using the second intermediate public key 214 that is received at the client device having memory 101. In one implementation, encryption key recovery component 208 may recreate the encryption key 127 based on the following formula:

$$K = z/(r\char`^X)$$

where operator "^" indicates an exponentiation operation, "K" is the encryption key 127 derived from a combination of "z" (which is the second intermediate public key 214), "r" (which is the server public key 137), and "X" (which is the private key value that was generated by detection component 202 upon detection of the presence of server device 103).

Once the encryption key 127 is recreated, the client device having memory 101 can then access the encrypted data 125. For example, the client device having memory 101 may use the encryption key 127 to decrypt the encrypted data 125. If the server device 103 is subsequently outside of the presence of the server device 103 (e.g., out of the determined range or off the network), the client device 102 discards or otherwise deletes the encryption key 127. In some implementations, the client device 102 may retain the key for a period of time even when that use of the key continues beyond the determined range (e.g., outside of the presence of server device 103). In some implementations, it may be necessary for the client device 102 to re-acquire the encryption key 127 again before the encrypted data 125 can be accessed. For example, if the client device moves within a certain range of the server device 103, the client device 102 may re-execute the operations disclosed herein for the acquisition of encrypted data 125.

Figure 3:
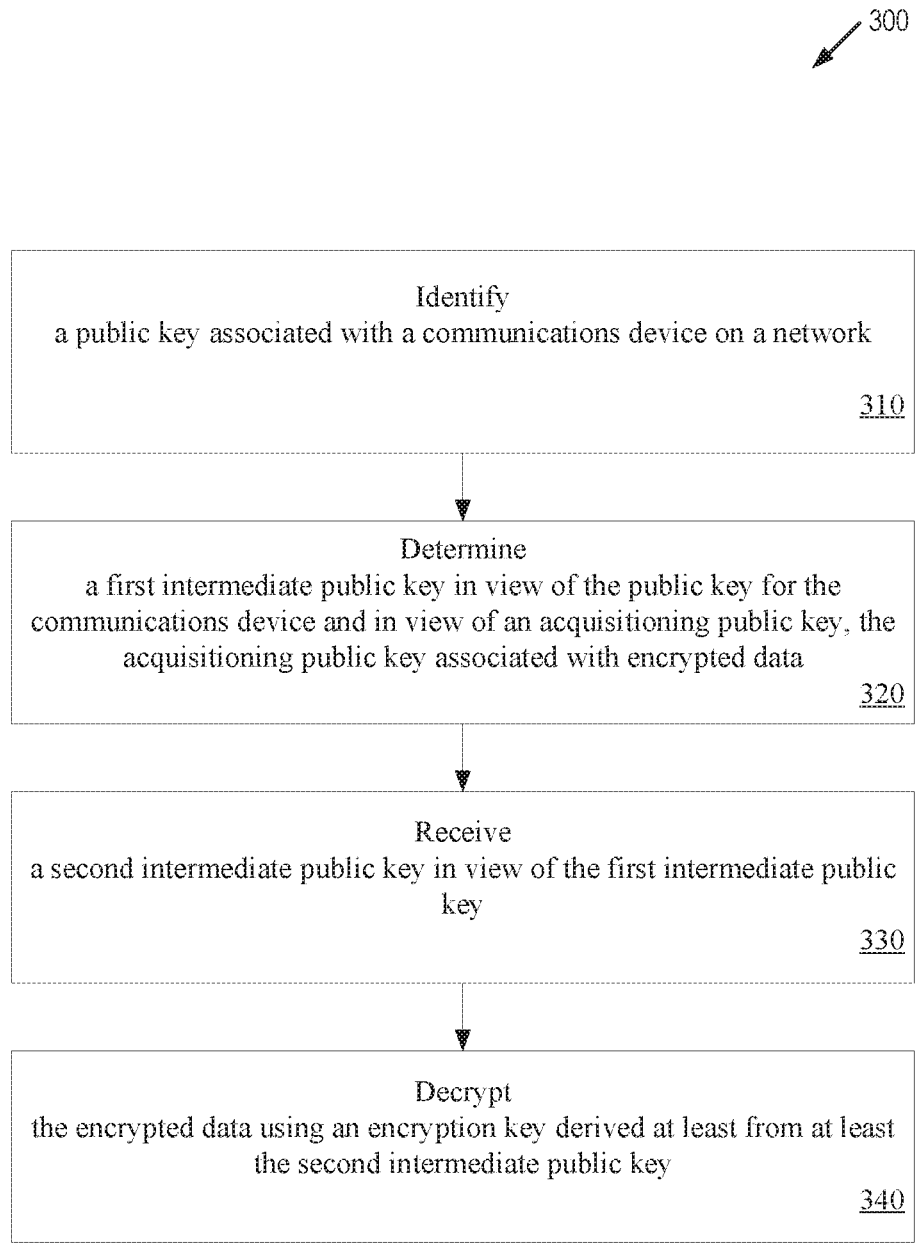
FIG. 3 depicts a flow diagram of a method for an acquisition of encrypted data in accordance with one or more aspects of the disclosure.

FIG. 3 depicts a flow diagram of a method 300 for acquisition of encrypted data in accordance with one or more aspects of the disclosure. In one implementation, the processing device 107 of FIG. 1 and FIG. 2 may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of a shared storage system. It should be noted that blocks depicted in FIG. 3 can be performed simultaneously or in a different order than that depicted.

Method 300 begins at block 310 where a public key associated with a communications device is identified. For example, client device 102 storing encrypted data may identify a public key associated with server device 103 in order to recover an encryption key to decrypt the data.

In block 320, a first intermediate public key is determined in view of the public key for the communications device and in view of an acquisitioning public key associated with the encrypted data. For example, the acquisitioning public key may be derived based on a formula using a number generator value and a random number.

In block 330, a second intermediate public key is received from the communications device in view of the first intermediate public key. For example, the server device 103 may compute the second intermediate public key 212 based on formula using the first intermediate public key. Then, client device 102 receives the second intermediate public key from the server device 103 over a network connection associated with public network 105. Because the second intermediate public key is transmitted in plaintext, the network connection over the public network 105 does not have to be secure.

In block 340, the encrypted data is decrypted using an encryption key derived from the second intermediate public key. For example, the encryption key may be determined using a formula based on the second intermediate public key and the provisioning public key.

Figure 4:
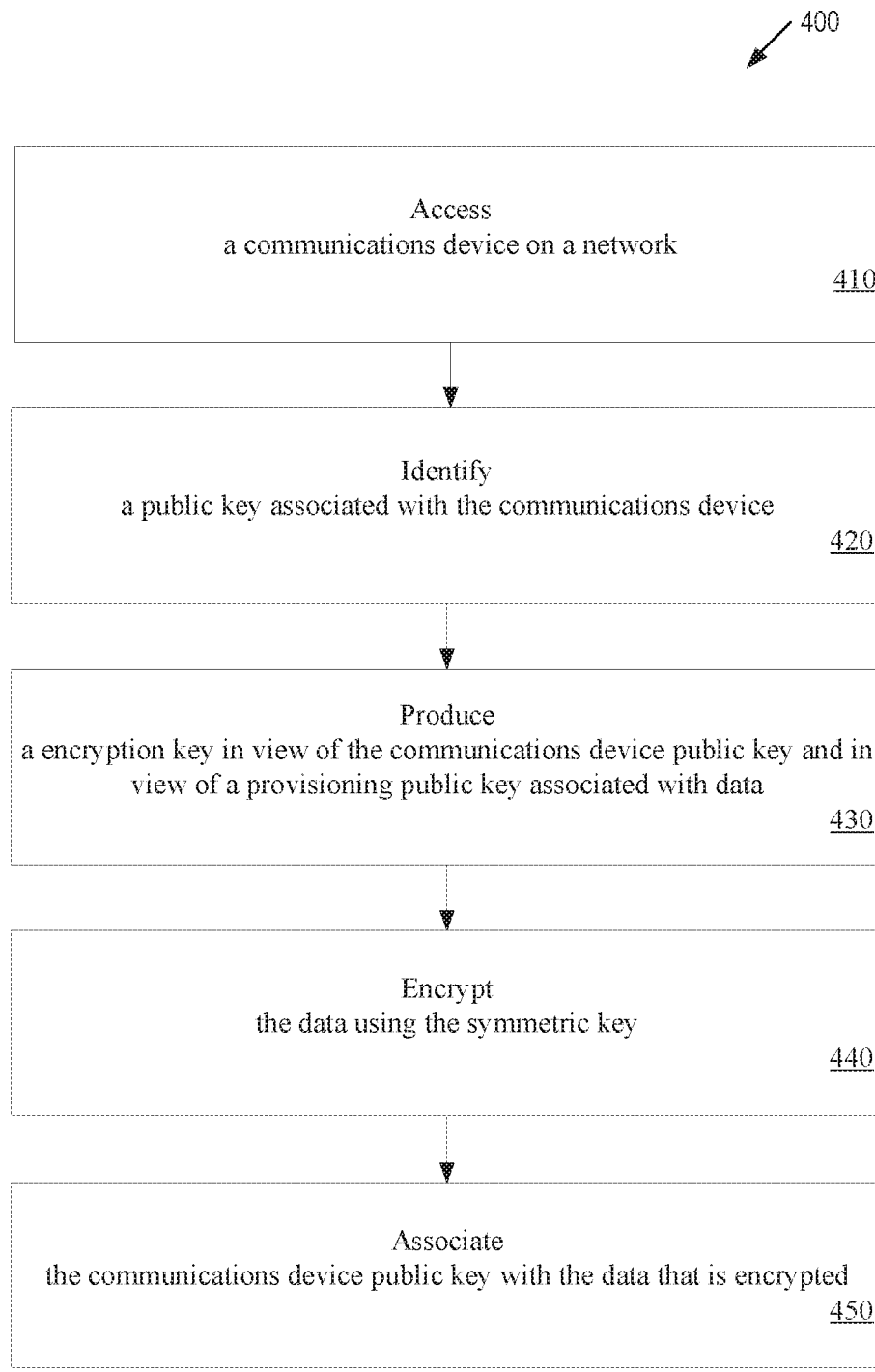
FIG. 4 depicts a flow diagram of another method for a provisioning of encrypted data in accordance with one or more aspects of the disclosure.

FIG. 4 depicts a flow diagram of another method 400 for a provisioning of encrypted data in accordance with one or more aspects of the disclosure. In one implementation, the processing device 107 of FIG. 1 and FIG. 2 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. It should be noted that blocks depicted in FIG. 4 can be performed simultaneously or in a different order than that depicted.

Method 400 begins at block 410 where a communications device on a network is accessed. For example, client device 102 may attempt to access server device 103 via network 104. If the access is succeeds, this indicates the presence of the server device 103. In block 420, a public key associated with a communications device is identified. For example, a client device may receive the public key from a server device, such as server device 103. In block 430, an encryption key is produced in view of the public key and in view of a provisioning public key associated with data. For example, the data may be stored on the client device 102. In block 440, the data is encrypted using the encryption key. In block 450, the public key of the communications device is associated with the data that is encrypted. For example, the public key may be stored in a data structure in memory of the client device.

Figure 5:
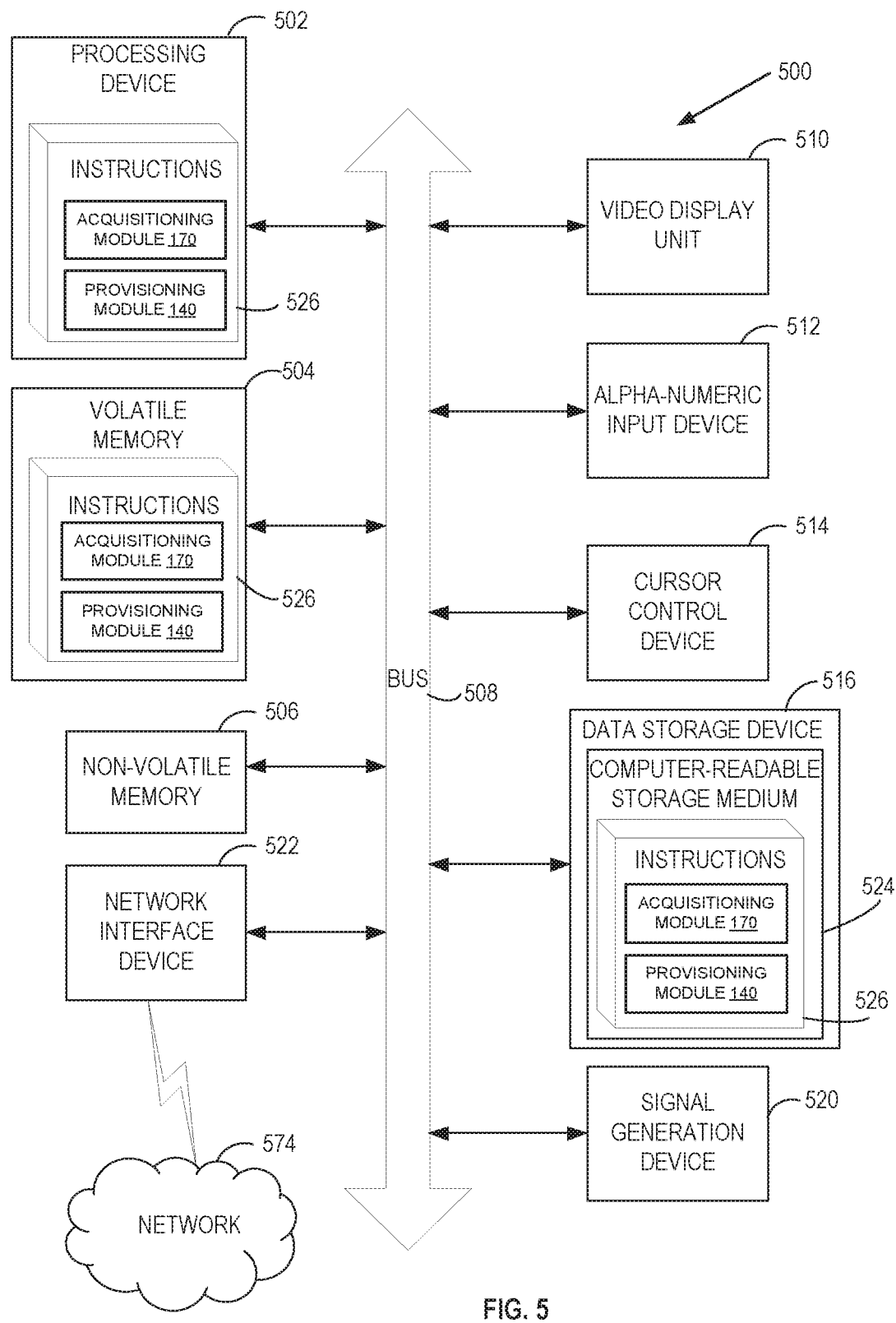
FIG. 5 depicts a block diagram of an illustrative computing device operating in accordance with the examples of the disclosure.

FIG. 5 depicts a block diagram of an illustrative computing device operating in accordance with the examples of the disclosure. In various illustrative examples, computer system 500 may correspond to a processing device within system 100 of FIG. 1 and FIG. 2. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for binding data to a network in the presence of an entity.

In a further aspect, the computer system 500 may include a processing device 502 (which may correspond to processing device 107), a volatile memory 504 (e.g., random access memory (RAM)), a non-volatile memory 506 (e.g., read-only memory (ROM) or electrically-erasable programmable ROM (EEPROM)), and a data storage domain 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage domain 516 may include a non-transitory computer-readable storage medium 524 on which may store instructions 526 encoding any one or more of the methods or functions described herein, including instructions encoding the techniques including the provisioning module 140 and acquisitioning module 170 of FIG. 1 for implementing method 300 of FIG. 3 or method 400 of FIG. 4 for the provision/acquisition of encrypted data upon the detection of a communications device.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, firmware modules or functional circuitry within hardware devices may implement the methods, components, and features of the disclosure. Further, the methods, components, and features may be implemented in any combination of hardware devices and computer program components, or in computer programs.

Unless specifically stated otherwise, terms such as "identifying," "determining," "encrypting," "decrypting," "associating," "receiving," "producing," "receiving," "detecting" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:

encrypting, by a processing device of a client device, data stored at a memory of the client device using an encryption key derived from a public key of a communications device on a network;

storing an association of metadata derived from the public key with the data encrypted by the encryption key such that the data is accessible when the client device is in a presence of the communications device;

in response to the client device moving outside of the presence of the communications device, deleting the encryption key;

in response to the client device returning to the presence of the communication device:

identifying, by the processing device of the client device storing encrypted data, the metadata derived from the public key in view of an identifier associated with the communications device;

determining, by the processing device, a first intermediate public key in view of the metadata derived from the public key and in view of an acquisitioning public key, the acquisitioning public key associated with the encrypted data;

receiving, from the communications device, a second intermediate public key in view of the first intermediate public key;

recreating, by the processing device, the encryption key using at least the second intermediate public key; and decrypting, by the processing device, the encrypted data using the recreated encryption key.

2. The method of claim 1, further comprising transmitting the first intermediate public key to the communications device; wherein the communications device to produce the second intermediate public key responsive to the transmitting.

3. The method of claim 1, further comprising determining the acquisitioning public key in view of a provisioning public key associated with the encrypted data.

4. The method of claim 3, wherein the provisioning public key is stored in memory of the client device.

5. The method of claim 4, further comprising determining the encryption key in view of the provisioning public key.

6. The method of claim 1, wherein the encryption key is maintained for a period of time while the client device is outside of the presence of the communications device.

7. A cryptographic system comprising:

a memory; and a processing device, operatively coupled to the memory, to:

encrypt data stored at a memory of a client device using an encryption key derived from a public key of a communications device on a network;

store an association of metadata derived from the public key with the data encrypted by the encryption key such that the data is accessible when the client device is in a presence of the communications device;

in response to the client device moving outside of the presence of the communications device, delete the encryption key;

in response to the client device returning to the presence of the communication device:

identify the metadata derived from the public key in view of an identifier for the communications device in response to an indication of a presence of the communications device;

determine a first intermediate public key in view of the metadata derived from the public key and in view of an acquisitioning public key, the acquisitioning public key is associated with the encrypted data;

receive, from the communications device, a second intermediate public key in view of the first intermediate public key; and recreate the encryption key to decrypt the encrypted data in view of at least the second intermediate public key.

8. The cryptographic system of claim 7, wherein the processing device is further to transmit the first intermediate public key to the communications device, and wherein the communications device to produce the second intermediate public key responsive to the transmitting.

9. The cryptographic system of claim 7, wherein the processing device is further to determine the acquisitioning public key in view of a provisioning public key associated with the encrypted data.

10. The cryptographic system of claim 9, wherein the provisioning public key is stored in the memory.

11. The cryptographic system of claim 10, wherein the processing device is further to determine the encryption key in view of the provisioning public key.

12. The cryptographic system of claim 11, wherein the encryption key is maintained for a period of time while the cryptographic system is outside of the presence of the communications device.

* * * * *